US006654911B1

United States Patent
Miles

(10) Patent No.: US 6,654,911 B1
(45) Date of Patent: Nov. 25, 2003

(54) INTERACTIVE TEST SEQUENCE GENERATION

(75) Inventor: James Darrell Miles, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 09/594,629

(22) Filed: Jun. 15, 2000

(51) Int. Cl.⁷ ................................................ G06F 11/00

(52) U.S. Cl. ............................ 714/38; 714/25; 717/124

(58) Field of Search .............................. 714/38, 57, 25, 714/46; 717/124; 702/123

(56) References Cited

U.S. PATENT DOCUMENTS

| | | | | |
|---|---|---|---|---|
| 5,671,351 A | * | 9/1997 | Wild et al. | 714/38 |
| 5,742,754 A | * | 4/1998 | Tse | 714/38 |
| 5,854,889 A | * | 12/1998 | Liese et al. | 714/43 |
| 5,905,856 A | * | 5/1999 | Ottensooser | 714/38 |
| 6,023,773 A | * | 2/2000 | O'Donnell et al. | 714/40 |
| 6,279,124 B1 | * | 8/2001 | Brouwer et al. | 714/38 |
| 6,304,982 B1 | * | 10/2001 | Mongan et al. | 714/38 |
| 6,360,332 B1 | * | 3/2002 | Weinberg et al. | 714/4 |
| 6,463,552 B1 | * | 10/2002 | Jibbe | 714/33 |
| 6,510,402 B1 | * | 1/2003 | Logan et al. | 702/186 |

\* cited by examiner

Primary Examiner—Scott Baderman
Assistant Examiner—Yolanda L Wilson
(74) Attorney, Agent, or Firm—Joseph P. Lally; Casimer K. Salys; John D. Flynn

(57) ABSTRACT

A method, system, and computer program product for generating test sequences are disclosed. Initially, a graphical user interface is invoked to display a list of preexisting test cases. A first test case is selected from the list of test cases and to create a first instance of the first test case, which is added to the test sequence. The test sequence is displayed in a test sequence portion of the graphical user interface. A subsequent test case is then selected from the list of test cases to create an instance of the subsequent test case, which is also added to the test sequence. The GUI may permit the modification of a parameter of the first test case by invoking a test case editor from the GUI. In one embodiment, the subsequent test case and the first case are the same such that first and second instances of the first test cases are included in the test sequence. In this embodiment, the first and second instances of the first test case may be is individually edited such that the first and second instances of the first test case have different parameter values. In another example, the subsequent test case is a second test case and the instance of the subsequent test case is a first instance of the second test case. The GUI may include a serial test command that results in a test sequence in which the first test case and the subsequent test case are executed serially. The GUI may further include a parallel test command that results in a test sequence in which the first test case and the subsequent test case are executed in parallel. The GUI may further include an execution selector for executing the generated test sequence on a system such as a computer network.

18 Claims, 5 Drawing Sheets

INTERACTIVE TEST SEQUENCE GENERATION

BACKGROUND

1. Field of the Present Invention

The present invention generally relates to field of computer software applications and more particularly to a system and method for building software test cases with an interactive graphical user interface.

2. History of Related Art

In the field of computers and, more particularly, computer networks, it is often desirable to characterize or debug the network by executing a specific sequence of events on the network to determine if the particular sequence produces any unanticipated actions or results. In a TCP/IP connected network, for example, multiple nodes of a network are interconnected and capable of communicating with one another. In such a network, a communication link or pipeline between any two nodes can be established by opening a "socket," which consists of an IP address and a port number for each node. When the socket is open, the nodes at either end of the pipeline communicate packets to transmit data (information) back and forth. When the data transmission is completed, the socket is closed to terminate the pipeline. The TCP/IP protocol is just one example of a mechanism by which nodes on a network can communicate with one another.

Because a network typically consists of large number of computers or other data processing devices or systems running on a variety of platforms, the number of events or sequences of events that the network may experience is virtually limitless and essentially impossible to predict or otherwise anticipate. Thus, the task of debugging or characterizing a network for reliable interaction between the nodes in a time effective manner is exceedingly difficult. Typically, the task of characterizing a network consists of a user writing a series of test sequences, each of which includes one or more test cases that are assembled in a manner determined by the user. The user must write a new test sequence for each specific sequence of events that the user wants to execute. Thus, the typical method of generating test sequences is manually intensive and makes it essentially impossible to produce enough test sequences to achieve any significant degree of coverage for a network of any appreciable complexity. It would therefore be desirable to simplify and automate the process by which a user generates test sequences to exercise a computer network or other similar system.

SUMMARY OF THE INVENTION

The problem identified above is in large part addressed by a method, system, and computer program product for generating test sequences as contemplated herein. Initially, a graphical user interface is invoked to display a list of preexisting test cases. A first test case is selected from the list of test cases to create a first instance of the first test case, which is added to the test sequence. The test sequence is displayed in a test sequence portion of the graphical user interface. A subsequent test case is then selected from the list of test cases to create an instance of the subsequent test case, which is also added to the test sequence. The GUI may permit the modification of a parameter of the first test case by invoking a test case editor from the GUI. In one embodiment, the subsequent test case and the first case are the same such that first and second instances of the first test cases are included in the test sequence. In this embodiment, the first and second instances of the first test case may be individually edited such that the first and second instances of the first test case have different parameters. In another example, the subsequent test case is a second test case and the instance of the subsequent test case is a first instance of the second test case. The GUI may include a serial test command that results in a test sequence in which the first test case and the subsequent test case are executed serially. The GUI may further include a parallel test command that results in a test sequence in which the first test case and the subsequent test case are executed in parallel. These commands may be nested to an arbitrary depth. The GUI may further include an execution selector for executing the generated test sequence on a system such as a computer network.

BRIEF DESCRIPTION OF THE DRAWINGS

Other objects and advantages of the invention will become apparent upon reading the following detailed description and upon reference to the accompanying drawings in which.

Figure 1:
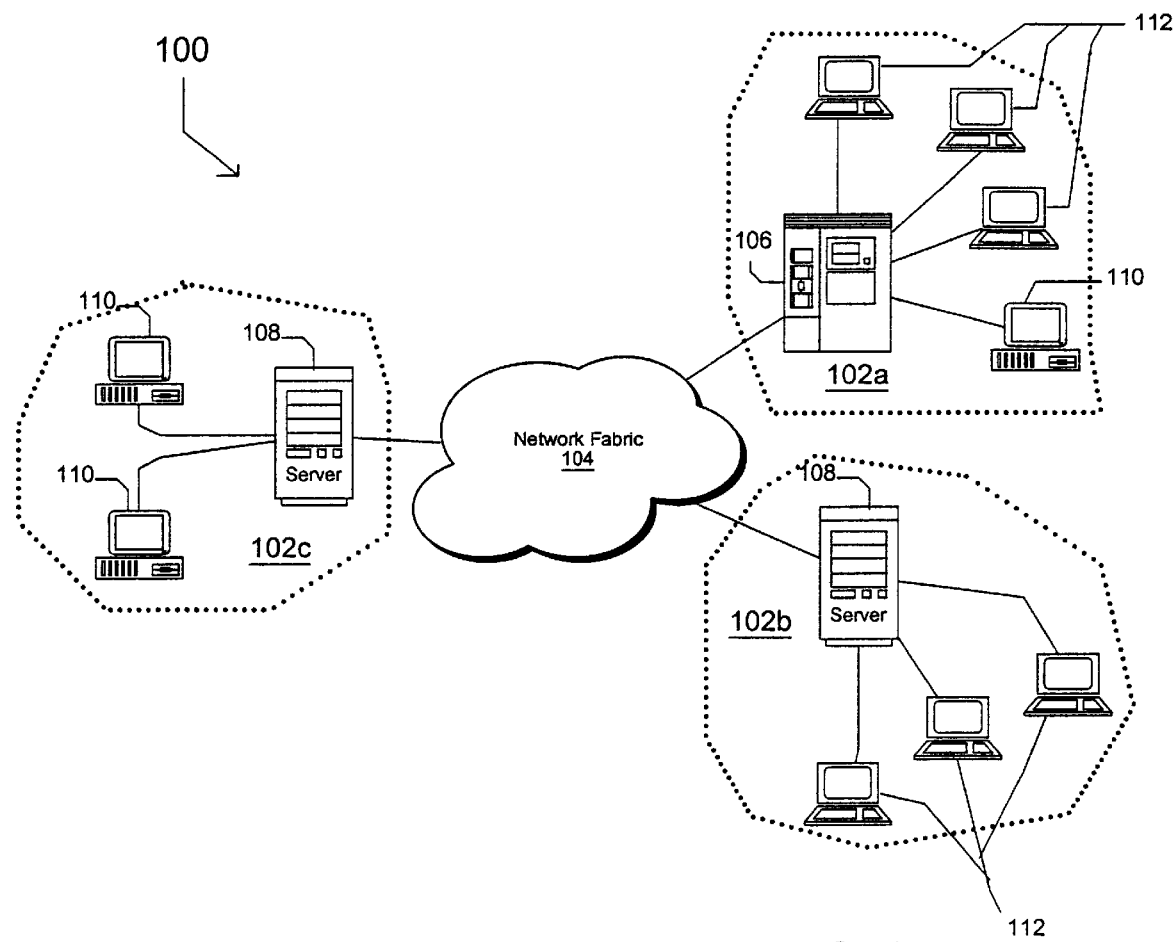
FIG. 1 is a simplified representation of a network of data processing devices.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 illustrates a computer network 100 suitable for use in conjunction with one embodiment of the present invention. Network 100 typically includes various nodes 102a, 102a, 102c, etc. (generically or collectively referred to as node(s) 102) that are interconnected via an interconnection fabric 104. A node 102 may include a mainframe computer 106, a server 108, a desktop computer 110, terminals or thin clients 112, as well as a variety of other devices including printers, routers, hubs, as will be familiar to those knowledgeable in the design of computer networks.

Communication between nodes 102 is enabled via various communication protocols including, as an example, the TCP/IP communication protocol familiar to users of the world wide web. Because the number of nodes can be extremely large and the types of nodes that comprise network 100 can vary significantly, network 100 can experience an essentially infinite number of event sequences. It is therefore difficult to create a sufficient number of test sequences for purposes of determining if network 100 is susceptible to any particular event sequences. This is particularly true if each test sequence must be written individually.

Generally speaking the invention contemplates a method of interactively generating test sequences. The method enables the user of a test sequence controller application to generate large numbers of test sequences quickly and easily. The preferred embodiment of the test sequence controller as contemplated herein enables the user to easily specify both serial and parallel sequences thereby permitting the creation of complex test sequences. In addition, the user is preferably permitted to generate test sequences by selecting from a list of test cases. A particular test case can be selected more than once per test sequence. Each instance of a test sequence can be customized using a test case editor of the test sequence controller.

In one embodiment, the invention is implemented as computer software that executes on a data processing system such as a microprocessor based computer. In this embodiment, the invention may comprise a computer program product that includes computer code means (instructions) that are executable by a microprocessor. The instructions may be contained in (encoded on) a suitable storage device such as a floppy diskette, a hard drive, a CD ROM, a DVD diskette, a tape storage, a non-volatile memory device such as a ROM or flash card, or a volatile memory storage element such a the system memory (i.e., DRAM) or cache memory (i.e., SRAM) of a data processing system.

Figure 2A:
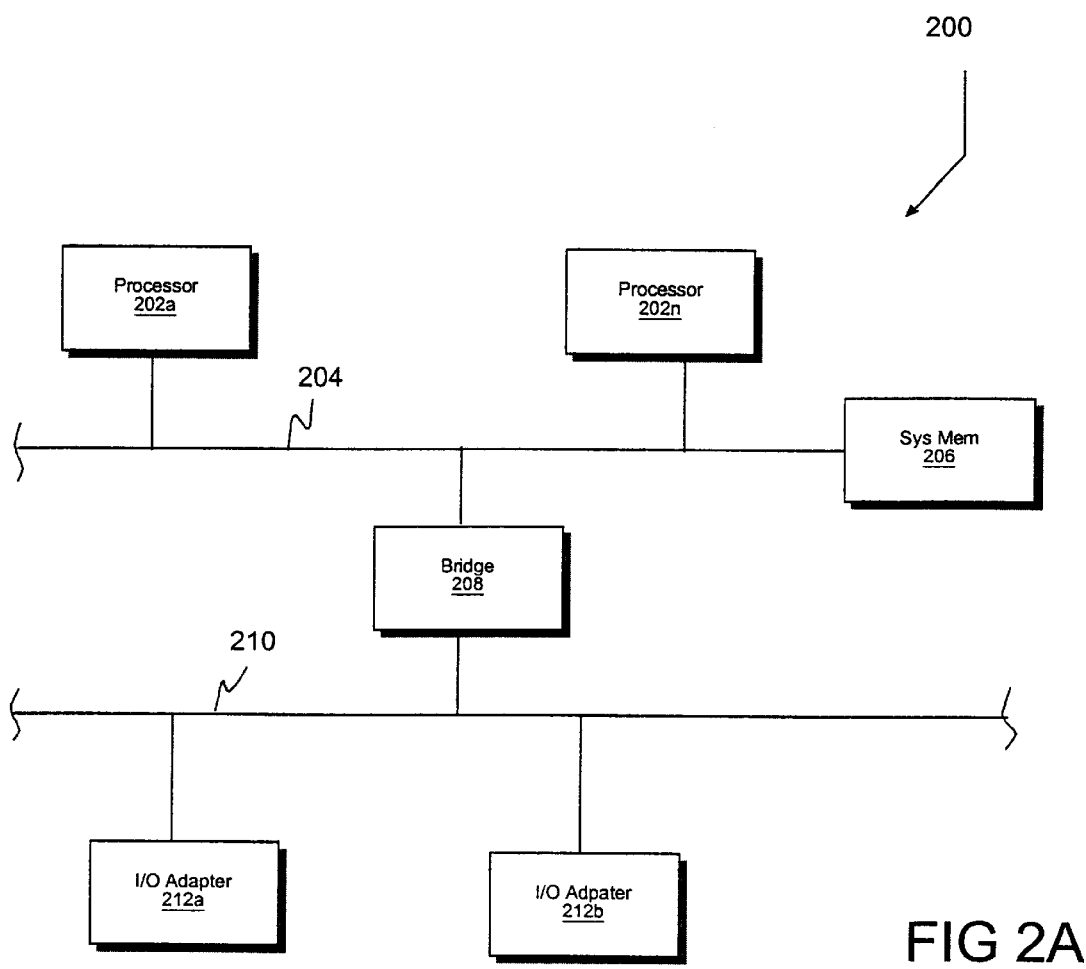
FIG. 2A illustrates a data processing system suitable for implementing a method of generating test sequences according to one embodiment of the invention.

Turning to FIG. 2A, a simplified block diagram of a data processing system 200 suitable for executing the computer software of the present invention is presented. In the depicted embodiment, data processing system 200 includes one or more processors 202a through 202n (generically or collectively referred to herein as processor(s) 202) connected to a system bus 204. A system memory 206 is accessible to processors 202 via system bus 204. Each processor 202 may be implemented as a reduced instruction set (RISC) microprocessor such as the PowerPC® microprocessor from IBM Corporation. In another embodiment, processors 202 may comprise x86 compatible microprocessors such as Pentium® processors from Intel Corporation and Athlon® processors from Advanced Micro Devices. Typically, operating system software is installed on each data processing system 200 of network 100. Suitable operating system software may include a Unix based operating system such as the AIX® operating system from IBM, a non-Unix based operating system such as the Windows® family of operating systems from Microsoft, or a network operating system such as JavaOS® from Sun Microsystems.

In the depicted embodiment, data processing system 200 includes a bus bridge 208 that couples system bus 204 to an I/O bus 210. Although only a single bus bridge 208 and a single I/O bus 210 are depicted, other embodiments of data processing system 200 may include multiple bridges 208 and multiple I/O busses 210. I/O bus may be implemented according to any of a variety of industry standardized I/O bus architectures including the industry standard architecture (ISA), the extended industry standard architecture (EISA), the peripheral components interface (PCI), and the advanced graphics peripheral (AGP) architecture, all as will be familiar to those in the field of microprocessor based computing systems.

Figure 2B:
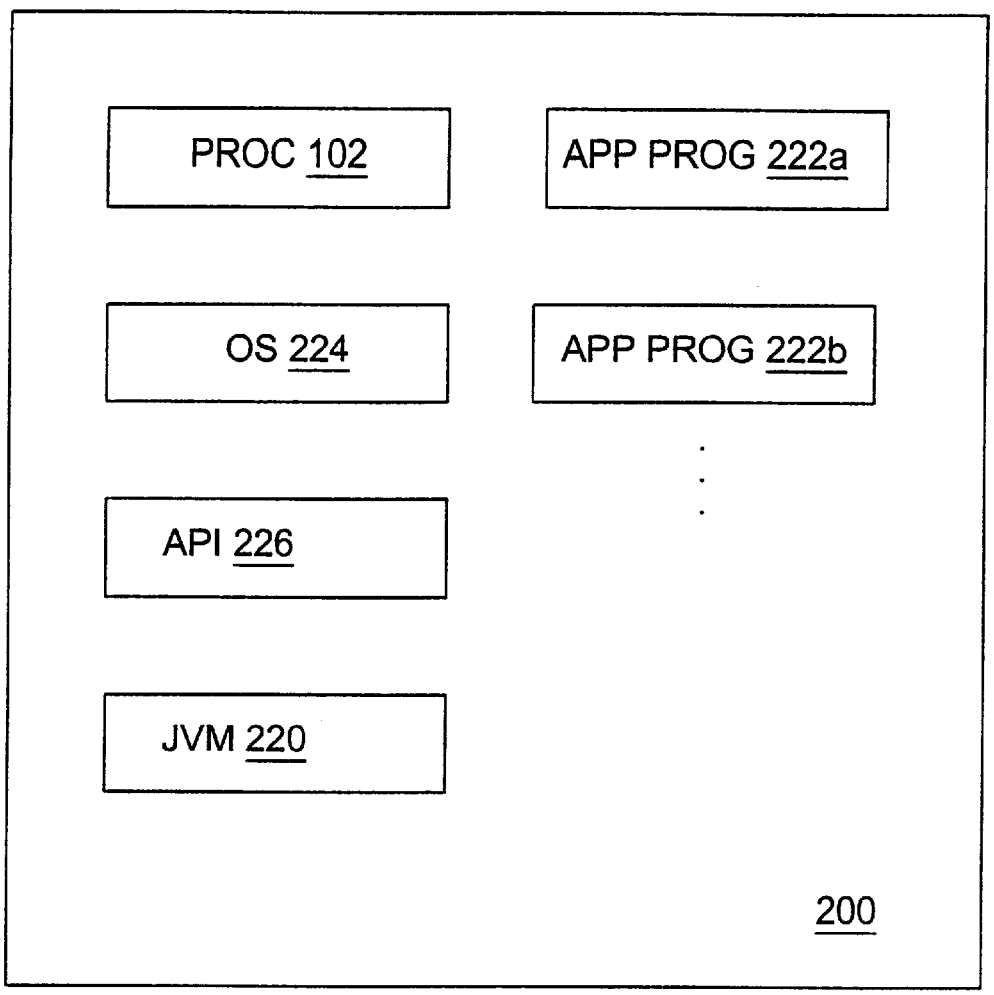
FIG. 2B is a block diagram of a software architecture of the data processing system of FIG. 2A according to one embodiment of the invention.

Turning now to FIG. 2B, a simplified block diagram of one embodiment of data processing system 200 emphasizing the system's software architecture is presented. In the depicted embodiment, system 200 includes a processor 102 discussed previously, as well as an operating system 224, an application programming interface (API) 226, and a Java virtual machine (JVM) 220. In addition, system 200 includes one or more application programs 222a, 222a, etc. (generically or collectively referred to herein as application program(s) 222). In one embodiment, each application program 222 represents a Java object or Java applet. JVM 220 is an abstract computing machine that includes an instruction set and uses various memory areas. JVM 220 provides a Java platform that is capable of hosting an application on any computer or operating system without rewriting or recompiling. JVM 220 is also responsible for the compactness of applications 222, which are preferably written in the Java programming language, and is the basis for its security capabilities. For additional information regarding Java and JVM 220, the reader is referred to T. Lindholm and F. Yellin, *The Java Virtual Machine Specification Second Addition* (Addison-Wesley 1999) ISBN: 0-201-43294-3, which is incorporated by reference herein.

Figure 3:
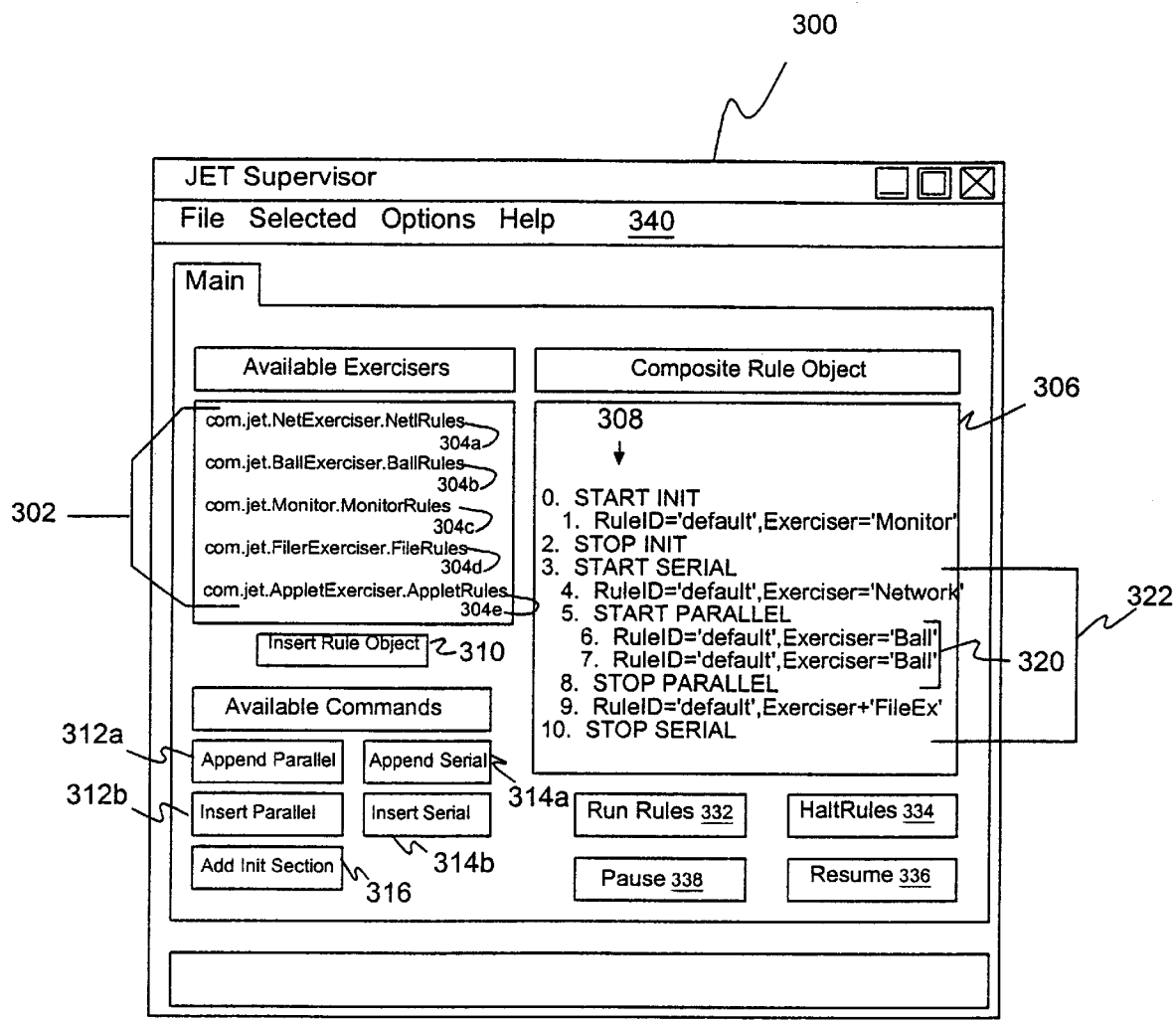
FIG. 3 depicts a graphical user interface according to one embodiment of the invention that is suitable for creating test sequences for exercising the network of FIG. 1.

In one embodiment, the invention comprises a method for generating a test sequence by invoking a graphical user interface (GUI) 300, an example of which is depicted in FIG. 3. In the depicted embodiment, GUI 300 includes a list 302 of previously defined test cases 304a, 304b, 304c, etc. (generically or collectively referred to herein as test case(s) 304). In embodiments of data processing system 200 that include a JVM 220, GUI 300 and test cases 304 may each comprise a Java object or applet. Each test case 304 includes code for performing a specific action. A test case 304, as an example, may include code sufficient to write a sample of data to a node 102 of network 100. In the list 302 of test cases 304 depicted in FIG. 3, test cases 304 include a test case (NetExerciser) suitable for exercising a portion of the network, a test case (BallExerciser) suitable for displaying a bouncing ball on a display screen, a test case (FileExerciser) for storing to or reading from a file, and a test case (AppletExerciser) that manipulates an applet.

Typically each test case 304 is developed by a support group that has specific knowledge of system 100. Allocating the development of individual test cases to a support group enables a user of GUI 300 (also referred herein as exerciser 300) who has relatively little knowledge of the specific implementation of system 100 to generate sophisticated test sequences that are suitable for executing on system 100. This permits the user charged with analyzing and characterizing system 100 as a whole to focus on generating test sequences that exercise a large number of desirable system interactions without worrying about the specific implementation of the system.

The depicted embodiment of GUI 300 includes a portion or window 306 for displaying a test sequence 308 generated with GUI 300. Test sequence 308 represents a composite of objects generated via GUI 300. The depicted embodiment of GUI 300 includes an Insert Rule Object button 310 that adds a selected test case 304 from list 302 into sequence 308. Typically, the user clicks on a test case 304 within the list 302 of test cases. Thereafter, by clicking the Insert Rule Object button 310, the selected test case 304 is added to list 308.

In addition, the depicted embodiment of GUI 300 includes command buttons 312a, 312a, 314a, 314b, and 316 that facilitate the creation of complex test sequences. More specifically, GUI 300 may include buttons for adding test cases 304 to sequence 308 in serial or in parallel. The insert parallel button 312a creates a parallel section (an example of which is identified in FIG. 3 by reference numeral 320) in sequence 308 prior to the current position highlighted in window 306 whereas the append parallel button 312a creates a parallel section in sequence 308 after the current position highlighted in window 306. (The current position within window 306 can be manipulated using a mouse or the arrow buttons on a standard keyboard). Once a parallel section 320 has been created, one or more tests cases can be added within the section by selecting the appropriate test case 304 from the list 302 of test cases and activating (clicking) the Insert Rule Object button 310. The parallel sections are identified by the insertion of START PARALLEL and STOP PARALLEL commands (see lines 5 and 8 of sequence 308). The parallel commands and command sequences enable the user to identify two or more test cases that are to be executed simultaneously when the test sequence is subsequently executed.

The command buttons of the depicted embodiment of GUI 300 further include an append serial button 314a and an insert serial button 314b. Clicking the append serial button 314a creates a serial section (one of which is identified in FIG. 3 by reference numeral 322) in test sequence 308 after the current position, which is highlighted in window 306. The insert serial button 314b creates a serial section in test sequence 308 prior to the current position. Within a serial section such as serial section 322, individual test cases are executed serially such that a subsequent test case begins executing immediately after a preceding test cases completes.

Serial and parallel sections of sequence 308 can be nested such that, for example, a parallel section of the sequence executes as one part of a serial section of the test sequence. This example is illustrated in the sequence 308 depicted in FIG. 3, wherein the parallel section 320 forms a step in the serial section 322 of sequence 308. More specifically, the depicted embodiment of sequence 308 includes a serial section 322 that includes a first test case (Line 4 of sequence 308) that initiates execution of the test case identified as the Network exerciser. Once the test case corresponding to Line 4 of sequence 308 completes, the parallel section 320 beings execution. Since parallel section 320 include two instances of the Ball exerciser (Lines 6 and 7), the sequence initiates parallel executions of the Ball exerciser test case. When each instance of the ball exerciser completes, the parallel section 322 is completed and the serial section 320 resumes by executing the test case in Line 9 identified as the File Exerciser.

The ability to combine and nest parallel and serial command sections within a single test sequence provides a powerful tool for creating complex test sequences. Furthermore, as illustrated by the example of the parallel section 322 depicted in FIG. 3, the user may specify the same test case more than once within a single test sequence.

Using the GUI 300 depicted in FIG. 3, a user can generate a test sequence quickly and easily by selecting a first test case 304 from the list 302 of test cases. This selection results in the creation of a first instance of the first test case 304. The first instance of first test case 304 is then added to test sequence 308 and preferably displayed in test sequence portion of GUI 300. Thereafter a subsequent test case is selected from list 302 of test cases 304 to create an instance of the subsequent test case that is added to test sequence 308. As indicated previously, a test sequence may include multiple instances of a single test case. Thus, the subsequent instance of the test case may be a second instance of the first test case. In this manner, GUI 300 is designed to facilitate the creation of complex software objects (corresponding to test sequence 308) from a list of relatively short and simple component objects (corresponding to the list 302 of test cases 304).

As depicted in FIG. 3, GUI 300 further includes an Add Init Section button 316 that generates an initial section of the composite object represented by sequence 308. Typically, the Init section of sequence 308 (Lines 0, 1 and 2 of sequence 308) is used to make declarations or to initiate test cases, such as the monitor test case, that are intended to run continuously while the remaining portions of the test sequence are executed. In the depicted embodiment of sequence 308, for example, the Init section is used to initiate execution of the monitor test case 304c that invokes the monitor prior to executing the remaining test cases.

Once the user has generated the desired test sequence 308, he or she may executed the sequence by activating the Run Rules button 332, halt it by clicking the Halt Rules button 334, resuming execution with Resume button 336, and pause execution by clicking pause execution button 338. Typically, all commands outside of the Init section of sequence 308, after being activated, run continuously until actively halted. In addition, the software object corresponding to test sequence 308 may be saved to and subsequently retrieved from an appropriate file via the File options in the menu selection bar 340 of GUI 300.

In one embodiment, each test case 304 in the list of test cases 302 is developed with a default set of rules that govern the behavior of the test case when the test case is executed. The rules for a test case that writes data to the network may, for example, indicate the amount of data written and the specific destination of the data. In the preferred embodiment, the default rules for each test case may be amended for each instance of the test case within test sequence 308.

Figure 4:
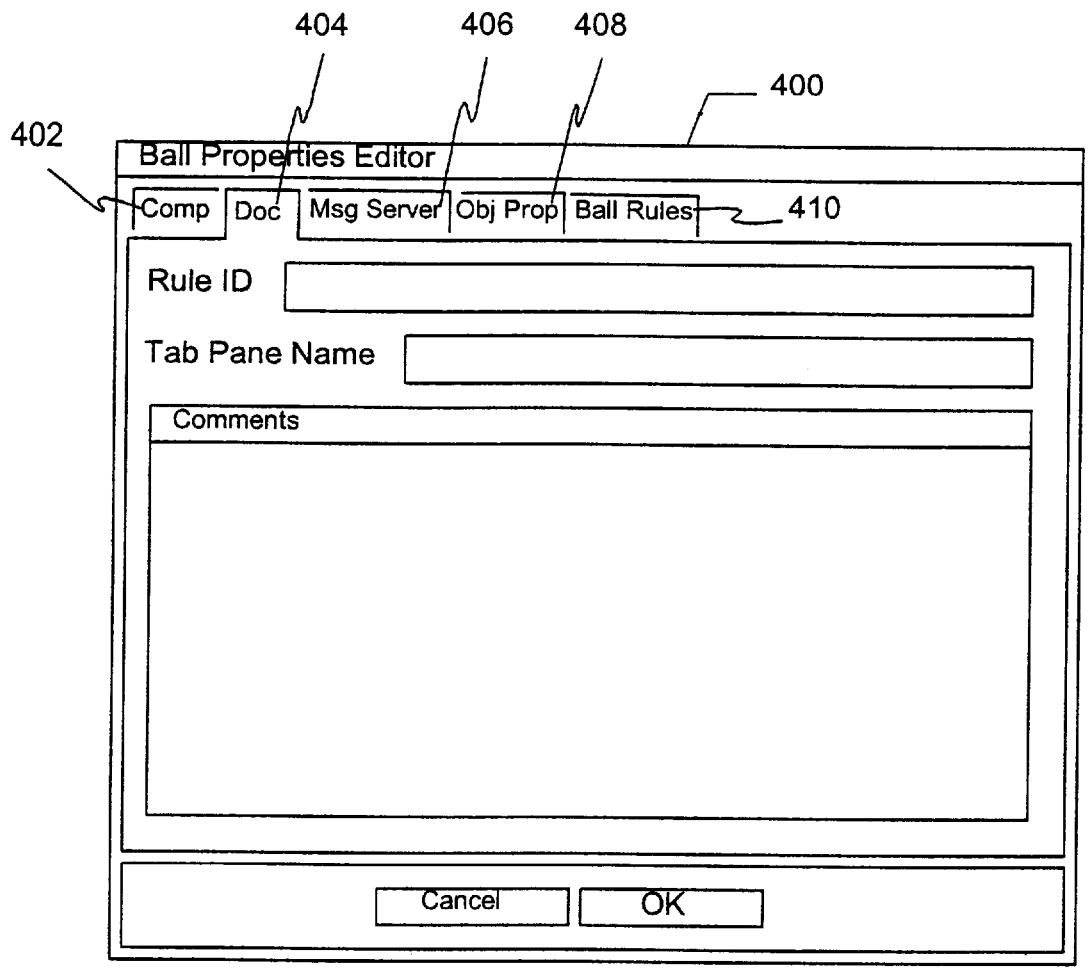
FIG. 4 depicts a graphical user interface according to one embodiment of the invention suitable for editing various parameters of the test cases generated with the graphical user interface of FIG. 3.

One embodiment of the invention enables the modification of test cases rules for each instance of a test case within the sequence 308 via an editing window (editor) that is invoked from GUI 300. Turning now to FIG. 4, an editing window 400 suitable for use with GUI 300 is depicted. Editing window 400 may include one or more standardized tabs 402, 404, 406, and 408 that define various parameters that are common to all test cases, such as naming labels or ID's. In addition, each editing window 400 may include one or more tab 410 that defines rules or parameters that are specific to the corresponding test case. In the depicted example, which illustrates the editing window 400 for the Ball Exerciser test case, the Ball Rules tab 410 may include parameters that control the color of the ball, the size of the ball, the speed of the ball, and other parameters applicable to the test case.

In one embodiment, editing window 400 may be invoked by double clicking an instance of the test case listed in test sequence 308. By providing a mechanism for modifying specific instances of each test case, editing window 400 of GUI 300 enables additional customization of the test sequence 308 that a user can generate. A user could invoke multiple instances of the same test case and modify the parameters of the test case to achieve a variety of test case instances where each instance of a test case has differing parameter values. The customization obtainable using editing window 400 enables the use of a smaller set of test cases 304 in list 302. As an example, it may be necessary to generate only a single test case for writing data to the network if the parameters in editing window 400 of the data writing test case allow specification of the amount of data, the content of data, and the destination.

It will be apparent to those skilled in the art having the benefit of this disclosure that the present invention contemplates a method and system for generating complex test sequences interactively using a graphical user interface. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method for generating a test sequence, comprising:
    invoking a graphical user interface, wherein the graphical user interface displays a list of test cases;
    adding a first instance of a first test case selected from the list of test cases to the test sequence;
    displaying the test sequence in a test sequence portion of the graphical user interface;
    adding an instance of a subsequent test case selected from the list of test cases to the test sequence;
    displaying the test sequence in the test sequence portion; and
    invoking a parallel test command of the graphical user interface to produce a test sequence in which the first test case and the subsequent test case are executed in parallel.

2. The method of claim 1, further comprising modifying a parameter of the first test case by invoking a test case editor from the graphical user interface.

3. The method of claim 1, wherein the subsequent test case is the first test case and the instance of the subsequent test case is a second instance of the first test case.

4. The method of claim 3, fiber comprising editing the first instance of the first test case and the second instance of the first test case such that the first and second instances of the first test case have different parameters.

5. The method of claim 1, wherein the subsequent test case is a second test case and the instance of the subsequent test case is a first instance of the second test case.

6. The method of claim 1, invoking a serial test and of the graphical user interface to produce a test sequence in which the first test case and the subsequent test case are executed serially.

7. The method of claim 1, further comprising executing the test sequence on a computer network.

8. A data processing system including processor, memory, and display, wherein the memory contains at least a portion of a sequence of instructions suitable for producing a graphical user interface (GUI), wherein the GUI is enabled to:
    display a list of test cases;
    permit selection of a first test case from the list of test cases and to create a first instance of the first test case responsive thereto;
    add the first instance of the first test case to a test sequence;
    display the test sequence including the first instance of the first test case in a test sequence portion of the GUI;
    permit selection of a subsequent test case from the list of test cases to create an instance of the subsequent test case;
    add the instance of the subsequent test case to the test sequence;
    display the test sequence, including the instance of the subsequent test case, in the test sequence portion; and
    produce a test sequence in which the first test case and the subsequent test case are executed in parallel.

9. The data processing system of claim 8, wherein the GUI permits a user to invoke an editor suitable for modifying a parameter of the fist test case.

10. The data processing system of claim 8, wherein the subsequent test case is the first test case and the instance of the subsequent test case is a second instance of the first test case.

11. The data processing system of claim 10, wherein the editor enables a user to modify parameters values corresponding to the first instance of the first test case and parameters values corresponding to the second instance of the first test case such that the first and second instances of the first test case have different parameter values.

12. The data processing system of claim 8, wherein the subsequent test case is a second test case and the instance of the subsequent test case is a first instance of the second test case.

13. The data processing system of claim 8, wherein the GUI includes a serial test command button to produce a test sequence in which the first test case and the subsequent test case are executed serially.

14. The data processing system of claim 8, wherein the GUI includes a button for executing the test sequence.

15. A computer program product comprising a set of processor executable instructions contained on a computer readable medium for generating a test sequence, the set of instructions comprising:
    computer code means for invoking a graphical user interface, wherein the graphical user interface displays a list of test cases;
    computer code means for adding a first instance of a first test case selected from the list of test cases to the test sequence;
    computer code means for displaying the test sequence in a test sequence portion of the graphical user interface;
    computer code means for adding an instance of a subsequent test case selected from the list of test cases to the test sequence;
    computer code means for displaying the test sequence in the test sequence portion; and
    computer code means for producing a test sequence in which the first test case and the subsequent test case are executed in parallel by invoking a parallel test command of the graphical user interface.

16. The computer program product of claim 15, further comprising computer code means for invoking a test case editor from the graphical user interface to modify a parameter of the first test case.

17. The computer program product of claim 16, further comprising computer code means for editing a first instance of the fist test case and a second instance of the first test case such that the first and second instances of the first test case have different parameter values.

18. The computer program product of claim 15, computer code means for producing a test sequence in which the fist test case and the subsequent test case are executed serially by invoking a serial test command of the graphical user interface.

* * * * *